United States Patent
Bezis et al.

(10) Patent No.: US 8,163,041 B1
(45) Date of Patent: Apr. 24, 2012

(54) BIO-SYNTHETIC FUEL AND METHOD

(75) Inventors: George T. Bezis, Lindon, UT (US); Larry P. Wardle, Bountiful, UT (US); Marcus G. Theodore, Salt Lake City, UT (US)

(73) Assignee: Stewardship Water & Gas Co, Salt Lake City, UT (US)

( * ) Notice: Subject to any disclaimer, the term of this patent is extended or adjusted under 35 U.S.C. 154(b) by 129 days.

(21) Appl. No.: 12/661,810

(22) Filed: Mar. 25, 2010

(51) Int. Cl.
*C10L 1/00* (2006.01)

(52) U.S. Cl. .............................. 44/307; 44/605; 44/628

(58) Field of Classification Search ................... 44/307, 44/628, 605
See application file for complete search history.

(56) References Cited

FOREIGN PATENT DOCUMENTS

KR 9205833 * 7/1992
WO WO2009158028 * 12/2009

OTHER PUBLICATIONS

Duckweed Aquaculture, A New Aquatic Farming System for Developing Countries by Paul Skillicom, Wiliam Spira, and William Journey, The World Bank Emena Technical Department Ag.
Duckweed: A biofuel and waste Treatment, Science News published Apr. 9, 2009; http://upi.com/Science_News/2009/04/09/Duckwood-A-biofuel- . . . .
Growing Duckweed to Recover Nutrients from Wastewaters and for Production of Fuel, Ethanol and Animal Feed:; Wiley InterSicience; Journals-Clean—Soil, Air, Water; http://www.

* cited by examiner

*Primary Examiner* — Cephia D Toomer
(74) *Attorney, Agent, or Firm* — Marcus G. Theodore

(57) ABSTRACT

A method for producing and using a duckweed bio-synthetic fuel suitable for co-firing with gaseous, liquid as well as solid carbon based fuels.

13 Claims, No Drawings

BIO-SYNTHETIC FUEL AND METHOD

BACKGROUND OF THE INVENTION

1. Field of Invention

The present invention relates to combustion fuels. In particular, it relates to a bio-synthetic fact composition and method of making and using the same.

2. Description of Related Art

According to the article, "Duckweed Aquaculture, A New Aquatic Fanning System for Developing Countries" by Paul Skillicorn, William Spira, and William Journey, The World Bank Emena Technical Department Agriculture Division: "www.p2pays.org/ref/09/08875.htm:

"Duckweed species are small floating aquatic plants found worldwide and often seen growing in thick, blanket-like mats on still, nutrient-rich fresh and brackish waters. They are monocotyledons belonging to the botanical family Lemnaceae and are classified as higher plants, or macrophytes, although they are often mistaken for algae. The family consists of four genera, *Lemna, Spirodela, Wolffia, and Wolffiella*, among which about 40 species have been identified so far.

All species occasionally produce tiny, almost invisible flowers and seeds, but what triggers flowering is unknown. Many species of duckweed cope with low temperatures by forming a special starchy "survival" frond known as a turion. With cold weather, the turion forms and sinks to the bottom of the pond where it remains dormant until rising temperatures in the spring trigger resumption of normal growth.

Morphology Duckweed species are the smallest of all flowering plants. Their structural and functional features have been simplified by natural selection to only those necessary to survive in an aquatic environment. An individual duckweed frond has no leaf, stem, or specialized structures; the entire plant consists of a flat, ovoid frond . . . . Many species may have hair-like rootlets which function as stability organs.

Species of the genus *Spirodela* have the largest fronds, measuring as much as 20 mm across, while those of *Wolffia* species are 2 mm or less in diameter. *Lemna* species are intermediate size at 6-8 mm. Compared with most plants, duckweed fronds have little fiber—as little as 5 percent in cultured plants—because they do not need structural tissue to support leaves or stems. As a result virtually all tissue is metabolically active and useful as a feed or food product. This important characteristic contrasts favorably with many terrestrial crops such as soybeans, rice, or maize, most of whose total biomass is left behind after the useful parts have been harvested.

Distribution Duckweed species are adapted to a wide variety of geographic and climatic zones and can be found in all but waterless deserts and permanently frozen polar regions. Most, however, are found in moderate climates of tropical and temperate zones. Many species can survive temperature extremes, but grow fastest under warm, sunny conditions. They are spread by floods and aquatic birds.

Duckweed species have an inherent capability to exploit favorable ecological conditions by growing extremely rapidly. Their wide geographic distribution indicates a high probability of ample genetic diversity and good potential to improve their agronomic characteristics through selective breeding. Native species are almost always available and can be collected and cultivated where water is available, including moderately saline environments.

Growth conditions The natural habitat of duckweed is floating freely on the surface of fresh or brackish water sheltered from wind and wave action by surrounding vegetation. The most favorable circumstance is water with decaying organic material to provide duckweed with a steady supply of growth nutrients and trace elements. A dense cover of duckweed shuts out light and inhibits competing submerged aquatic plants, including algae.

Duckweed fronds are not anchored in soil, but float freely on the surface of a body of water. They can be dispersed by fast currents or pushed toward a bank by wind and wave action. If the plants become piled up in deep layers the lowest layer will be cut off from light and will eventually die. Plants pushed from the water onto a bank will also dry out and die. Disruption of the complete cover on the water's surface permits the growth of algae and other submerged plants that can become dominant and inhibit further growth of a duckweed colony.

To cultivate duckweed a farmer needs to organize and maintain conditions that mimic the natural environmental niche of duckweed: a sheltered, pond-like culture plot and a constant supply of water and nutrients from organic or mineral fertilizers. Wastewater effluent rich in organic material is a particularly valuable asset for cultivating duckweed because it provides a steady supply of essential nutrients and water.

In this case there is a coincidence of interests between a municipal government, which would treat the wastewater if it could afford to do so, and nearby farmers, who can profitably do so.

Production rates Duckweed reproduction is primarily vegetative. Daughter fronds bud from reproductive pockets on the side of a mature frond. An individual frond may produce as many as 10 generations of progeny over a period of 10 days to several weeks before dying. As the frond ages, its fiber and mineral content increases, and it reproduces at a slower rate.

Duckweed plants can double their mass in less than two days under ideal conditions of nutrient availability, sunlight, and temperature. This is faster than almost any other higher plant. Under experimental conditions their production rate can approach an extrapolated yield or four metric tons/ha/day of fresh plant biomass, or about 80 metric tons/ha/year of solid material. This pattern more closely resembles the exponential growth of unicellular algae than that of higher plants and denotes an unusually high biological potential.

Average growth rates of unmanaged colonies of duckweed will be reduced by a variety of stresses: nutrient scarcity or imbalance; toxins; extremes of pH and temperature; crowding by overgrowth of the colony; and competition from other plants for light and nutrients.

Actual yields of fresh material from commercial-scale cultivation of *Spirodela, Lemna*, and *Wolffia* species at the Mirzapur experimental site in Bangladesh range from 0.5 to 1.5 metric tons/ha/day, which is equivalent to 13 to 38 metric tons/ha/year of solid material.

Nutritional value Fresh duckweed fronds contain 92 to 94 percent water. Fiber and ash content is higher and protein content lower in duckweed colonies with slow growth. The solid fraction of a wild colony of duckweed growing on nutrient-poor water typically ranges from 15 to 25 percent protein and from 15 to 30 percent fiber.

Duckweed grown under ideal conditions and harvested regularly will have a fiber content of 5 to 15 percent and a protein content of 35 to 45 percent, depending on the species involved, . . . . Data were obtained from duckweed colonies growing on a wastewater treatment lagoon and from a duckweed culture enriched with fertilizer.

Duckweed protein has higher concentrations of the essential amino acids, lysine and methionine, than most plant proteins and more closely resembles animal protein in that respect, . . . compares the lysine and methionine concentrations of proteins from several sources with the FAO standard recommended for human nutrition.
. . .
Cultured duckweed also has high concentrations of trace minerals and pigments, particularly beta carotene and xanthophyll that make duckweed meal an especially valuable supplement for poultry and other animal feeds. The total content of carotenoids in duckweed meal is 10 times higher than that in terrestrial plants; xanthophylls concentrations of over 1,000 parts per million (ppm) were documented in poultry feeding trials in Peru . . . . This is economically important because of the relatively high cost of the pigment supplement in poultry feed.
. . .
A monoculture of Nile tilapia and a polyculture of Chinese and Indian carp species were observed to feed readily on fresh duckweed in the Mirzapur experimental program. Utilizing duckweed in its fresh, green state as a fish feed minimizes handling and processing costs. The nutritional requirements of fish appear to be met completely in ponds receiving only fresh duckweed, despite the relatively dilute concentration of nutrients in the fresh plants. The protein content of duckweed is compared with several animal feed ingredients . . . ."

Although duckweed is as prolific as algae, it is only now being considered as a feedstock for biofuel. See for example, "Duckweed: A biofuel and waste treatment", *Science News* published Apr. 9, 2009; www.upi.com/Science_News/2009/04/09/Duckweed-A-biofuel- . . . , wherein North Carolina State University researchers propose to covert the starch from duckweed into ethanol using the same distillation facilities currently used for corn. Although this is a better feedstock, the high energy cost to make ethanol and distill it for separation makes this approach unattractive. For a similar ethanol production proposal, also see "Growing Duckweed to Recover Nutrients from Wastewaters and for Production of Fuel Ethanol and Animal Feed"; Wiley InterScience: JOURNALS-CLEAN-Soil, Air, Water; www3.intersicince.wiley.com/journal/121645918/abstract?Cr. This approach uses amylases for enzymatic hydrolysis of the duckweed biomass with a reducing sugar to produce ethanol for subsequent extraction.

The present method produces a bio-synthetic fuel without the need for oil or alcohol extraction and is suitable for co-firing with liquid as well as solid carbon based fuels.

SUMMARY OF THE INVENTION

The present invention comprises a bio-synthetic fuel and method for producing the same. The bio-synthetic fuel is derived from separating duckweed from its aqueous growth media and fermenting it before or after grinding it into pulp to form a pulverized duckweed feedstock with cellular fragments capable of adsorbing OH radical gases and liquids from fermented sugars. The duckweed often grows with lesser amounts of algae, which is not separated from the duckweed feedstock. The algae, when held in the dark under the same anaerobic conditions, forms lipids and alcohol radicals in solution. This duckweed/algae feedstock mixture will hereinafter all be referred to as duckweed and is usually held at least 100 hours in the dark until the proteins form fatty acids and the pulverized cellulose cell walls are radicalized so that they act as contact binders in aqueous solution. The amount of water in the separated duckweed before pulverization may be varied if different fuel burning characteristics require more water. For example, fuels with additional water provide a longer smoother cooler burning flame, but usually contains a lesser BTU content. Consequently, most feedstock mixtures for boilers are formulated to reduce the amount of water in the separated duckweed to provide a higher BTU/lb feedstock. Those used for turbines contain increased amounts of water.

When duckweed feedstock is grown to clean treated wastewater, it may contain oils and grease from community cooking practices intermixed with the duckweed. For Example, the Hill Canyon Wastewater Treatment Plant located at 9600 Santa Rosa Road, Camarillo, Calif. 93012 operated by Thousand Oaks, Calif. serves a large Hispanic community, which uses a lot of cooking oils. These cooking oils end up in the wastewater at the local wastewater treatment plant. The ponds at the wastewater treatment plant typically are infested with duckweed, which could be harvested. This harvested duckweed with oil and grease would not have to have the oils and grease removed before fermentation, as the biofuel production process discussed below requires the addition of oils as part of the production process.

The duckweed feedstock is typically held at least 100 hours in the dark under anaerobic conditions for the fermentation reaction to occur. This fermented blackened duckweed has no sugars and is used primarily as a binder and source of fatty acids for the bio-fuel. Consequently, a radicalized sugar solution reagent is reacted therewith as described below to provide the necessary radicals in the bio-synthetic fuel balance for proper ignition. A typical mixture mixes 15% water with 5% radicalized sugar solution reagent, which is held for four hours for the reaction to occur forming the fuel reagent. This fuel, reagent mixture can be modified to an up to 30% water solution.

If the duckweed protein content is not sufficient or fluctuates over the year, it may be supplemented after fermentation into fatty acids by adding other oils such as petroleum oils or vegetable oils to provide the desired combustion and consistency. Alternatively, the co-firing fuel mixture ratio may be adjusted to provide the combustion performance required to perform work.

The pulverized duckweed feedstock is saturated with a radicalized sugar solution reagent made from:
1. a given volume of sugar feedstock containing (x) moles of sugars 15% to 75% by weight with low cellulose composition with
2. a dilute volume of hydrogen peroxide containing (y) moles of hydrogen peroxide; the ratio of moles of sugars to moles of hydrogen peroxide (x/y) selected to provide the desired combustion properties of the resultant fuel additive;
3. an iron 2 catalyst which initially turns green in the presence of the hydrogen peroxide solution,
4. sufficient volume of diluted sulfuric acid to turn the green iron 2 catalyst solution to a yellow/brown iron 3 solution at a pH of approximately 5.5; and
5. holding the yellow/brown iron 3 solution for 48 hours or more in the dark at a pH of between 5 and 6.5 until the sugars cross link forming numerous OH, O double bonds, and O-R groups to produce a dark brown radicalized sugar solution reagent,
and fermented and modified in the dark under anaerobic conditions until available proteins and carbohydrates form volatile fatty acids and volatiles and the oxygen is driven off. Usually this takes approximately 100 hours and provides a duckweed feedstock, which readily expands like yeast to adsorb OH radicalized gases and liquids in the sugar solution reagent, minimizing the need for emulsification surfactants when mixed with oils. Thus, the entire duckweed plant is used as fermented duckweed feedstock as a binder.

This fermented duckweed feedstock is then mixed with sufficient supplemental oils and radicalized sugar solution reagent to form a duckweed fuel reagent mixture containing 70-80% fermented pulverized duckweed, 15-25% radicalized sugar solution reagent, and 5-30% oil, which is held and fermented in the dark under anaerobic conditions until a duckweed bio-synthetic fuel suitable for co-firing with 5% to 50% by weight pulverized solid or fluid carbon sources.

The fermented duckweed feedstock is then mixed together with a 15% to 25% parts by weight radicalized sugar solution reagent such as that made by Environmental Biofuels, Inc. of Bountiful, Utah under the tradename "Q solution".

A small amount of oil may be added to the Q solution to absorb the fermented duckweed better. However, there is no need for pH adjusting the fermented duckweed feedstock for the reaction to go to completion. If small amounts of acid or heat are added the reaction may be expedited.

The fermented duckweed and radicalized sugar solution reagent is then again held in the dark under anaerobic conditions for at least 100 hours to drive the fermentation reaction to completion and form a fuel reagent with binders mixture. Supplemental plant or vegetable oils are then added to this mixture whose duckweed and cellular components adsorb the oils to form the bio-synthetic fuel.

The resultant bio-synthetic fuel stays in suspension for several hours, and only needs to be slightly stirred or shaken before burning to insure proper mixing. It has a varying BTU composition dependent upon the protein and sugar content of the biomass components, which vary based on time of harvest, the amount of sunlight, temperature, and other growing conditions.

One good source of duckweed feedstock is that used by wastewater treatment plants to absorb and remove undesirable contaminants in the wastewater. The treated wastewater is deposited in open treatment ponds, where the duckweed is grown and harvested to effectively remove a wide variety of contaminants and absorb nitrates and phosphates. The use of duckweed for wastewater treatment is extremely effective, but was discontinued because of its extremely foul odor when allowed to ferment. To overcome this problem, the separated raw duckweed may be stored in sealed containers to ferment before fermenting with the radicalized sugar solution, so the pulverizing step may be performed before or after fermentation of the duckweed. Where odor control is required, the separated fresh duckweed is immediately pulverized and saturated with the radicalized sugar solution and then placed in sealed containers for fermentation to form the fermented duckweed feedstock, which has less of an odor.

As the protein and fiber chemical components of differing duckweed feed stocks vary and radicalized sugar solutions vary, the amount of vegetable oil added is also varied and is adjusted until the desired burn characteristics are achieved by flame tests of different mixtures until the desired bio-synthetic fuel is achieved to provide the required flame characteristics.

If the bio-synthetic fuel is first co-fired with another fuel, a plasma gas is generated. This plasma gas may be run through a plasma gas separator before complete burning to separate and concentrate unburned organic intermediaries, such as ketones, aldehydes, and alcohols, into a higher BTU/lb fuel, which is then injected into a combustion turbine for final combustion and energy release. This concentrated higher BTU/lb fuel is easier to inject and blend with other gases entering the combustion turbine for operation at a higher energy input level.

Typically, the bio-synthetic fuel is made from approximately 70-80% fermented pulverized duckweed, 15-25% radicalized sugar solution reagent, and 5% oil. Preferred oils added are vegetable and plant oils, such as canola, coconut, and corn oil. This bio-synthetic fuel is then stored away from air and held preferably in the dark until the chemistry reactions stop (usually no more than 100 hours).

Similarly, the hydrogen peroxide (x/y) ratio of the radicalized sugar solutions may be varied to compensate for variations in the sugar content. An x/y ratio of more than one is used to provide a duckweed bio-synthetic fuel with unreacted sugars, which, when ignited, produces a longer more modulated flame. An x/y ratio of less than one is used to provide a duckweed bio-synthetic fuel with unreacted hydrogen peroxide, which, when ignited, produces flash ignition. Or, an x/y ratio of approximately one is used to provide a duckweed bio-synthetic fuel with reacted hydrogen peroxide and sugars, which, when ignited, produces more complete combustion Thus flame testing is required to adjust not only the x/y ratio of the radicalized sugar solutions, but the various ratios of fermented duckweed to oil to radicalized sugar solution to provide the desired combustion characteristics of the bio-synthetic fuel. Once a properly burning bio-synthetic fuel is achieved, the ratio of bio-synthetic fuel to be co-fired with a solid or fluid carbon fuel source is then adjusted to meet the burn requirements of a particular device.

From 5% to 50% by weight bio-synthetic fuel is then co-fired with or added to a 95% to 50% solid or fluid carbon source fuel. The bio-synthetic fuel/carbon source fuel ratio is dependent upon the desired co-firing burn characteristics, and the required BTU content of the combined fuels. For example, if the bio-synthetic fuel only has a BTU content of approximately 5,000 BTU's/lb., and is to be co-fired in a coal fired boiler, increased proportions of bio-synthetic fuel to coal or natural gas may be required to meet the boiler efficiency and emissions requirements.

As a biofuel, its NOx emissions are higher than coal or natural gas. These NOx emissions can be reduced by staging air addition in coal or natural gas fired boilers to provide a reducing environment at the initial point of burning resulting in nitrogen and carbon monoxide production. The carbon monoxide is then oxidized later in the furnace with the addition of more air so that nitrogen and carbon dioxide is produced instead of NOx and carbon monoxide.

One preferred high protein duckweed bio-synthetic fuel using duckweed gathered in the summer was suitable for boiler co-firing with coal or natural gas contains 80 parts duckweed, 60 parts sugar solution and 60 parts canola oil, producing a bio-synthetic fuel with a BTU content of approximately 11,590 BTU/lb. (Timpview Analytical Laboratories or Orem, Utah Certificate of Analysis dated Oct. 20, 2009). Because of the high BTU content, this fuel composition can be combined in a 1:1 ratio with coal, depending upon price, emissions, available tax credits, and bio-fuel credits.

This preferred bio-synthetic fuel had a total water content of 83% and slowed the burn rate of the co-fired fuels for more complete combustion.

Later attempts to duplicate this fuel using a duckweed feedstock gathered in the late fall using the same percentage components only provided an approximately 5,034 BTU/lb bio-synthetic fuel. Thus the duckweed feedstock composition varies depending upon specie, time of harvest, climate, weather conditions, etc.

In another duckweed bio-synthetic fuel for boiler co-firing, the ratio of fermented duckweed to radicalized sugar solution and oil was the same, but was mixed without heating. This resulted in a bio-synthetic fuel which had a BTU content of approximately 4,781 BTU/lb. (Timpview Analytical Laboratories or Orem, Utah Certificate of Analysis dated Jan. 27, 2010).

In another duckweed bio-synthetic fuel for boiler co-firing, the ratio of fermented duckweed to radicalized sugar solution and oil was the same, but a small amount of sulfuric acid was added, which had a BTU content of approximately 3,936 BTU/lb. (Timpview Analytical Laboratories or Orem, Utah Certificate of Analysis dated Jan. 27, 2010), so the acid actually slowed the rate of reaction.

As can be seen from these last four examples, the photo biomass bio-synthetic fuel fluctuates in BTU and flame characteristics as growth and fermentation conditions vary. Hence, flame testing of various mixtures is required to adjust blends to provide the burn characteristics required, which typically average around 4,500 BTU/lb.

To produce a bio-synthetic fuel suitable for turbine combustion with a lower BTU content, but more expansion, more water and less oil is added. A preferred bio-synthetic turbine fuel contained 60 parts fermented duckweed, 30 parts sugar solution and 40 parts oil is blended together. The blending and fermenting sequence was slightly altered for producing this bio-synthetic turbine fuel. After the radicalized sugar solution is added to the duckweed, any surplus radicalized sugar solution reagent is drained off after mixing with the fermented duckweed feedstock. The saturated fermented duckweed feedstock floats on top and separates from excess radicalized sugar solution reagent for easy removal by mechanical separation. Alternatively, it may be floated off by electrophoresis to expedite the separation by bubbling air through the solution mixture with a little oil added to float off the saturated fermented duckweed feedstock as a foam. The saturated fermented duckweed feedstock was then supplemented with unreacted radicalized sugar solution to provide the turbine bio-synthetic combustion fuel.

Two examples of this turbine bio-synthetic combustion fuel produced by this decanting method are:

a. 60 parts duckweed, 30 parts sugar solution and 40 parts oil, which has a BTU content of approximately 4872 BTU/lb. (Timpview Analytical Laboratories or Orem, Utah Certificate of Analysis dated Dec. 29, 2009).

b. 60 parts duckweed, 30 parts sugar solution and 30 parts oil, which has a BTU content of approximately 3787 BTU/lb. (Timpview Analytical Laboratories or Orem, Utah Certificate of Analysis dated Dec. 29, 2009).

Thus, to provide a bio-synthetic fuel suitable for a particular application, its components are mixed and fermented based on flame tests to insure a bio-synthetic fuel, which burns with the required flame propagation. This bio-synthetic fuel is then co-fired with a carbon fuel and the ratio of bio-synthetic fuel to carbon fuel varied to provide the required burn characteristics for a particular work application.

This duckweed bio-synthetic fuel containing water and oil mixtures does not require emulsification before burning, but is simply stirred to insure adequate mixing. When co-fired with solid fuels, natural gas, propane, and other combustible gases, and liquid fuels, the duckweed bio-synthetic fuel is particularly suited for two-flame propagation combustion. It also uses all varieties and fractions of the duckweed photo biomass for combustion; thereby saving energy distillation and costs of conventional biofuel processes, such as ethanol production.

The above description and specification should not be construed as limiting the scope of the invention, but as merely providing illustrations of some of the presently preferred embodiments of the invention. Thus, the claims themselves recite those features deemed essential to the invention.

We claim:

1. A method for producing a duckweed biosynthetic fuel comprising:
   a. separating duckweed from its aqueous growth media and macerating the duckweed to form a pulverized duckweed feedstock with cellular fragments, which adsorb OH radical gases and liquids from fermented sugars,
   b. mixing the duckweed feedstock together with a 15% to 25% parts by weight radicalized sugar solution reagent with OH gases and liquids in solution made from:
      1. a given volume of sugar feedstock containing (x) moles of sugars and cellulose composition with
      2. a dilute volume of hydrogen peroxide containing (y) moles of hydrogen peroxide; the ratio of moles of sugars to moles of hydrogen peroxide (x/y) selected to provide the desired combustion properties of a resultant fuel additive;
      3. an iron 2 catalyst which initially turns green in the presence of the hydrogen peroxide solution,
      4. sufficient volume of diluted sulfuric acid to turn the green iron 2 catalyst solution to a yellow/brown iron 3 solution at a pH of approximately 5.5; and
      5. mixing the sugar feedstock with the yellow/brown iron 3 solution and holding the yellow/brown iron 3 solution for 48 hours or more in the dark at a pH of between 5 and 6.5 until the sugars cross link forming numerous OH, O double bonds, and O-R groups to produce a radicalized sugar solution reagent;
   c. holding the pulverized duckweed feedstock and radicalized sugar solution reagent under dark anaerobic conditions to ferment and modify available proteins and carbohydrates into volatile fatty acids to produce a fermented duckweed feedstock,
   d. adding and adsorbing sufficient vegetable, synthetic or petroleum-based oils to the fermented duckweed feedstock to form a duckweed fuel reagent mixture containing 70-80% by weight fermented duckweed feedstock, 15-25% by weight radicalized sugar solution reagent, and 5-30% by weight oil, and
   e. holding and fermenting the duckweed fuel reagent mixture in the dark under anaerobic conditions until a duckweed bio-synthetic fuel is produced, and
   f. flame testing various bio-synthetic fuel mixtures and adjusting the oil to radicalized sugar solution ratio until a bio-synthetic fuel mixture with the desired flame characteristics are achieved for co-firing with 50% to 95% by weight pulverized solid or fluid carbon fuel sources.

2. A method for producing a duckweed bio-synthetic fuel composition according to claim 1, wherein the separated duckweed is first fermented and then pulverized before the oil and radicalized sugar solution reagent is added.

3. A method for producing a duckweed bio-synthetic fuel composition according to claim 1, wherein the solid carbon source is pulverized coal.

4. A method for producing a duckweed bio-synthetic fuel composition according to claim 1, wherein the fluid carbon source is petroleum oils or vegetable oils.

5. A method for producing a duckweed bio-synthetic fuel composition according to claim 1, wherein the ratio of duckweed feedstock to radicalized sugar solution reagent is approximately 20 parts by weight radicalized sugar solution reagent to 80 parts by weight fermented pulverized duckweed feedstock.

6. A method for producing a duckweed bio-synthetic fuel composition according to claim 1, wherein the sugar to hydrogen peroxide (x/y) ratio is more than one to provide a duckweed bio-synthetic fuel with unreacted sugars, which, when ignited, produces a longer more modulated flame.

7. A method for producing a duckweed bio-synthetic fuel composition according to claim 1, wherein the sugar to hydrogen peroxide (x/y) ratio is less than one to provide a duckweed bio-synthetic fuel with unreacted hydrogen peroxide, which, when ignited, produces flash ignition.

8. A method for producing a duckweed bio-synthetic fuel composition according to claim 1, wherein the sugar to hydrogen peroxide (x/y) ratio is approximately one to provide a duckweed bio-synthetic fuel with reacted hydrogen peroxide and sugars, which, when ignited, produces more complete combustion.

9. A method for producing a duckweed bio-synthetic fuel composition according to claim 1, wherein the duckweed is 92-94% water and has a solids content of 6-8% with the solids containing 5 to 15% fiber content, 35-40% protein content, 5 to 7% fat content, and 11 to 18% ash content.

10. A method for producing a duckweed bio-synthetic fuel composition according to claim 1, wherein fermentation steps c and e take place in the dark for at least 100 hours.

11. A duckweed bio-synthetic fuel produced by a method of claim 1.

12. A method of using the bio-synthetic fuel produced by the method of claim 1, including varying the ratio of bio-synthetic fuel co-fired with a pulverized solid or fluid carbon fuel to meet combustion performance requirements.

13. A method of for producing a duckweed bio-synthetic fuel composition according to claim 1, wherein the aqueous growth media is wastewater, which the duckweed cleans as it grows to produce a treated wastewater and duckweed feedstock.

* * * * *